(12) United States Patent
Pilon et al.

(10) Patent No.: US 7,428,299 B2
(45) Date of Patent: Sep. 23, 2008

(54) MEDIA GATEWAY BULK CONFIGURATION PROVISIONING

(75) Inventors: Mark Christopher Pilon, Stittsville (CA); Shaun Patrick Hennessy, Nepean (CA); Stephen Edgar Ellis, Ottawa (CA)

(73) Assignee: Alcatel Lucent, Paris (FR)

( * ) Notice: Subject to any disclaimer, the term of this patent is extended or adjusted under 35 U.S.C. 154(b) by 1450 days.

(21) Appl. No.: 10/319,553

(22) Filed: Dec. 16, 2002

(65) Prior Publication Data

US 2004/0114572 A1    Jun. 17, 2004

(51) Int. Cl.
 *H04M 1/24* (2006.01)
(52) U.S. Cl. ............... 379/15.03; 717/105; 370/352; 370/254
(58) Field of Classification Search ............ 370/352, 370/254, 255, 338, 401; 717/105; 379/15.03, 379/201.12
See application file for complete search history.

(56) References Cited

U.S. PATENT DOCUMENTS

| | | | | |
|---|---|---|---|---|
| 7,117,241 B2* | 10/2006 | Bloch et al. | ............. | 709/201 |
| 7,126,941 B1* | 10/2006 | Clemm et al. | ............. | 370/352 |
| 2003/0035417 A1* | 2/2003 | Zirojevic et al. | ............. | 370/357 |
| 2005/0076386 A1* | 4/2005 | Carter et al. | ............. | 725/111 |

OTHER PUBLICATIONS

U.S. Appl. No. 60/314,745.*

* cited by examiner

*Primary Examiner*—Olisa Anwah

(57) ABSTRACT

A method and a tool for provisioning media gateway resources in a network management context are presented. Circuit emulation entities are selected via the interaction with the tool in a combination of configuration and selection contexts. Further circuit emulation entity identification may be effected by using a combination of filter options. Once a list of identified circuit emulation entities is generated, a determination is made as to which entities are available. Connection control over all selected available circuit emulation entities is either relinquished or regained via a network management system by interacting with the tool. Relinquishing connection control for the selected circuit emulation entities includes, but is not limited to, configuring thereof for H.248 signaling, configuring port buffers, reserving resources at network nodes. The advantages are derived from a bulk media gateway provisioning at reduced costs lowering entry barriers in migrating circuit-switched service content transport over a packet-switched infrastructure.

5 Claims, 4 Drawing Sheets

MEDIA GATEWAY BULK CONFIGURATION PROVISIONING

FIELD OF THE INVENTION

The invention relates to provisioning voice communications services over packet-switched infrastructure, and in particular to methods for configuring edge devices enabling the provisioning of voice services over packet-switched infrastructure.

BACKGROUND OF THE INVENTION

In the field of telecommunications, voice services such as the ubiquitous telephone service, also known as Plain Old Telephone Service (POTS), have been provisioned using circuit-switched technologies over a circuit-switched infrastructure. Other services provisioned using circuit-switched technologies include, but are not limited to, facsimile transmission and video conferencing.

The benefits provided by the circuit-switched infrastructure stem from a very high Quality-of-Service enabled by the reservation of a specific amount of bandwidth for each established connection end-to-end and the use of hot standby bandwidth to ensure minimal exposure to circuit-switched infrastructure failures. The circuit-switched infrastructure includes main and hot standby equipment, and main and hot standby interconnecting trunks.

The drawbacks come from huge costs incurred deploying, maintaining, modifying, etc. the redundant circuit-switched infrastructure. Another drawback comes from an inefficient utilization of the reserved bandwidth particularly accentuated by the fact that the reserved hot standby bandwidth is not intended to ever be used. If human voice is conveyed during a telephone session, which represents the most extensive use of circuit switched technologies, up to 60% of the reserved main bandwidth is also wasted as the human voice has an activity factor of 0.4. Facsimile and video conference services have a much higher activity factor.

In the field of telecommunications, data services are being provisioned using packet-switched technologies over a packet-switched infrastructure. Packet-switched technologies provide bandwidth utilization efficiencies at reduced equipment, deployment, maintenance, etc. costs. However, without reserving bandwidth and without using a redundant infrastructure, packet-switched technologies only provide best-effort transport of data. Resiliency to packet-switched infrastructure failures is typically built-in as Protocol Data Units (PDU) including packets, frames, etc. are routed in transit at intermediary network nodes in the transport path between connection end-points. Service provisioning typically does not benefit from a high QoS.

Recent packet-switched technology advances include Asynchronous Transfer Mode (ATM) and MultiProtocol Label Switching (MPLS) packet-based technologies which address the typical QoS issues mentioned above.

ATM in particular uses fixed size PDUs, known as cells, to convey data payloads in an ATM network with enforced data traffic constraints providing a high QoS. The combined benefits of a high QoS data transport and reduced deployment and maintenance cost of the ATM infrastructure, make ATM technologies a good candidate in provisioning voice services over packet-switched infrastructure. And, there is pressure to migrate voice services, currently provisioned over circuit-switched infrastructure, over to packet-switched infrastructure.

The provisioning of voice services over packet-switched infrastructure is a current topic of intense research, and development. However, solution deployment is not as extensive as expected. The biggest hurdles to overcome in migrating traditional voice services to packet-switched infrastructure, have to do with the fact that the local loop infrastructure, which represents the largest portion of circuit-switched infrastructure, always has, and still typically provides analog signal transport only. Local loops are dedicated pairs of copper wires connected to a local exchange telephone switch, also known as a Service Switching Point (SSP), at one end, and at the other end, to a telephone jack at a customer's premises. The local loop infrastructure has changed very little since the initial deployment of telephone services. Changes to the extensive local loop infrastructure are prohibitive in terms of cost.

Attempts have been made at adapting local loop infrastructure to support digital data transport however Digital Subscriber Line (DSL) solutions suffer from a limited reach and incur large deployment costs. To date the deployment of DSL services have concentrated on Internet service provisioning within a limited distance from the local exchange telephone switch where DSL deployment costs may at least be recovered in part.

With the advent of the digital telephone exchange, the circuit-switched technology of today provides for the digitization of the analog audio signal at digital local exchange telephone switches, and for redundant digital signal transport over the redundant circuit-switched infrastructure using Time Division Multiplexing (TDM) technologies. The provision for analog-to-digital conversion is a plus in migrating circuit-switched voice telecommunications services to packet-switched infrastructure. Some bandwidth utilization efficiencies may be taken advantage of.

Making reference to FIG. 1, current voice services are typically provided from a POTS termination 102, over a local loop 104, via a digital exchange SSP 106. Analog audio signal conversion to a digital TMD signal conversion is performed on the customer side of the SSP 106.

Connection control and TDM signal transport, from the SSP 106 and over the Public Switched Telephone Network 110, is provided via a layered infrastructure.

A connection control layer includes signaling links 122, and a connection controller, also known as a Signal Control Point (SCP) 120. The connection control layer uses packet-switched technologies to process packetized signaling messages known as the Signaling System 7 (SS7) protocol.

The TDM signal transport layer includes redundant TDM signal transport trunks 112, and a hierarchy of redundant circuit-switching equipment including, but not limited to, local exchanges 106 and tandem exchanges 116. The tandem exchanges 116 form a layered hierarchy typically mimicking government jurisdictional associations (only one layer of the hierarchy is shown). Each local exchange SSP 106 is also know as a Class 5 switch, while the tandem exchanges 116 are also known as Class 4 switches.

The redundant TDM trunks 112 come in a variety of transport capacities including: T1/DS-1, a North American Standard trunk providing for the time division multiplexed conveyance of 24 digitized voice signals; E1, an European Standard trunk providing for the time division multiplexed conveyance of 32 digitized voice signals; and multiples thereof.

In establishing a connection end-to-end, a POTS termination 102, goes off-hook, analog dialing signals conveyed over the local loop 104 are interpreted by the SSP 106, the SSP 106 sends an SS7 connection request over a signaling link 112 to the connection controller SCP 120, SCP 120 determines the destination POTS termination 102 across the Public Switched Telephone Network PSTN 110, sends SS7 setup signaling messages over signaling links 122 to a determined group of telephone exchanges including the end SSPs 106 and intermediary redundant tandem telephone exchanges 116.

Once the setup signaling messages are interpreted and redundant resources are reserved, the SSP 106 associated with the destination POTS termination 102 is instructed to apply a ring signal on to the local loop 104 associated with the destination POTS termination 102.

Once the destination POTS termination 102 picks up, the SSPs 106 digitize audio signals received over respective local loops 104 and the resulting digitized audio signals are sent over the redundant reserved infrastructure in the PSTN 110 between the SSPs 106. Each digitized audio signal received at an SSP 106 is played back, in analog form, over a corresponding local loop 104.

Current research and development has enabled the substitution of much of the expensive redundant circuit-switched digital signal transport infrastructure in the core of the PSTN 110 with a packet-switched data transport infrastructure. FIG. 2 is a schematic diagram showing an exemplary deployment using ATM packet-switched technology and equipment.

An ATM data transport network, as shown at 210, includes ATM nodes 206 and interconnecting links 204. The ATM infrastructure of the ATM network 210 is managed by a Network Management System (NMS) 230. In particular, the NMS 230 monitors every aspect of the entire ATM infrastructure under its realm of management including: link status, network node status, available transport bandwidth, reserved transport bandwidth, available processing bandwidth, etc. Connection control in the ATM network is provided via a Connection Manager (CM) 240 associated with the NMS 230. The connection manager 240 instructs ATM network nodes 206(216) to establish data connections based on connection requests received from edge network nodes 250.

Data and ATM Private Network-Node Interface (PNNI) signaling messages are conveyed employing fixed size cells. Each cell carries a payload of 48 bytes.

In order to provide transport of voice service digital signals, ATM technology development led to Media Gateway (MG) ATM network nodes 216 and the development of a Media Gateway Controller (MGC) 220.

Special physical layer equipment, referred to as circuit emulation equipment, implementing media gateway functionality is used to convey a TDM signal using ATM cells and conversely to extract and combine ATM cell payloads to regenerate a TDM signal. When circuit emulation equipment at a media gateway network node 216 is used for conveying TDM signals over the ATM infrastructure, the circuit emulation equipment receives connection control instructions from the MGC 220 associated with the connection controller 120 and not from the connection manager 240 associated with the NMS 230.

With the circuit emulation equipment configured to receive connection control instructions from the MGC 220, the MGC 220 uses signaling links 222 to instruct media gateway nodes 216 to request Permanent Virtual Circuit (PVC) connection establishment from the connection manager 240 as connections are needed over the ATM network 210. If Soft PVCs (SPVCs) are used, then on receipt of instruction from the MGC 220 to establish a connection, a media gateway node 216 collaborates with other ATM network nodes 206 via PNNI signaling to establish the connection without involving the connection manager 240. At all times, the NMS 230 retains the ability to monitor and configure the circuit emulation equipment and the media gateway nodes 216.

FIG. 3 is a schematic diagram showing interconnected network elements implementing connected data transport networks.

Network nodes 206, 216-A, 216-B are physically interconnected via physical links 204 in data transport networks 210. Data transport networks 210 may be bridged via bridge data network nodes 306 to enable data exchange therebetween. Connected data transport networks 210 can be grouped defining areas of focus and influence for the purposes of network management, known as network partitions 308.

All data network equipment is subject to design choices which are bound to be different from vendor to vendor. With regards to data network equipment, for example network nodes schematically shown in FIG. 3, an equipment vendor may chose to implement an integral device 216-B having a switching processor and a group of ports 312. Of particular relevance are network nodes 216-B having circuit emulation ports 312. Another equipment vendor may chose a customizable implementation of a network node 216-A including: a switching fabric, an equipment rack divided into shelves, each shelf 322 having slot connectors for connection with interface cards, each interface card 324 having at least one port 312. Of particular relevance are network nodes 216-B having circuit emulation interface cards 324 with at least one circuit emulation port 312. The two network nodes 216-A and 216-B provide the same cell switching function. The network node 216-A is better adapted to provide high throughput.

Media gateway network nodes 216 including circuit emulation equipment, when not operating as media gateways are managed by the NMS 230. The NMS 230 makes use of a containment hierarchy 400 shown in FIG. 4 for management thereof.

In configuring physical links 212 for TDM signal transport, to provision transport for voice services over cell-switched infrastructure, the connection control over the associated circuit emulation ports 312 must be relinquished to the MCG 220. The hand-over includes configuring of the relevant circuit emulation ports 312 to operate in accordance with the Internet Engineering Task Force (IETF) Megaco protocol specification, which is incorporated herein by reference. The International Telecommunications Union (ITU) H.248 media gateway protocol represents an exemplary implementation of the IEFT Megaco protocol, the specification of the ITU H.248 media gateway protocol is incorporated herein by reference.

Prior art techniques used in configuring respective circuit emulation equipment to operate in compliance with the H.248 media gateway protocol, include using an Element Management System (EMS) to manually connect to the media gateway network node 216, navigating through configuration prompts via manual prompt command line input, identifying each relevant circuit emulation interface card 324 and each circuit emulation port 312, and determining which DS1 channel of the corresponding physical link 212 is not in use, configuring DS1 channel operational parameters to enable H.248 protocol support, etc.

Performing these manual steps is very time consuming and error prone particularly considering that in configuring channelized circuit emulation ports 312, the configuration has to be performed for each DS1 channel associated with the circuit emulation port 312. Consider a typical deployment example wherein the circuit emulation port 312 is an Optical Carrier (OC)-3 port. Each OC-3 circuit emulation port 312 has a transport capacity divided into 84 DS1 channels each of which needs to be configured individually. Media gateway network nodes 216-A employ multiple circuit emulation interface cards 324, the aggregate of which implement dozens of OC-3 circuit emulation ports 312. Suppose an exemplary node 216-A has a dozen of OC-3 circuit emulation ports 312 designated to carry traffic for voice services—manual configuration of 84×12=1008 DS-1 channels needs to be performed. This amount of manual provisioning represents a huge entry barrier for migrating circuit-switched voice services over packet-switched infrastructure. Depending on the vendor equipment used, H.248 support may only be activated on a per-DS-0 channel basis which further compounds manual provisioning problems for the necessary large scale deployment.

Prior art developments attempting to alleviate this configuration drawback include the use of scripts to automate parts of the manual provisioning process. However, these attempts are limited typically to channel DS-1/DS-0 operational parameter changes. The selection of the relevant circuit emulation equipment, circuit emulation equipment components, and configuration contexts still being limited to manual work. Further automation through scripts is of little value given a typical diverse vendor deployment of network nodes 216-A/216-B in a network 210 as every vendor equipment has a different implementation of the command prompt interface for element management and requires the use of different element management systems.

There therefore is a need to reduce the huge entry barrier in configuring equipment to provide packet-switched transport for circuit-switched voice services.

SUMMARY OF THE INVENTION

In accordance with an aspect of the invention, a method of provisioning media gateway resources in a network management context is provided. The method includes identifying a plurality of managed circuit emulation entities, selecting a group of available managed circuit emulation entities; and setting operational parameters corresponding to a subgroup of available managed circuit emulation entities to configure connection control functionality for each available managed circuit emulation entity. The bulk identification of the plurality of managed circuit emulation entities in the network management context reduces media gateway resource provisioning overheads in provisioning transport for circuit-switched services over a packet-switched infrastructure.

In accordance with another aspect of the invention, in setting operational parameters to configure connection control functionality for a managed circuit emulation entity, the method of provisioning media gateway resources includes relinquishing connection control over each available managed circuit emulation entity over to a media gateway controller.

In accordance with a further aspect of the invention, in setting operational parameters for an available managed circuit emulation entity the method of provisioning media gateway resources further includes reserving connection identifiers for circuit-switched service use to enable support for circuit-switched service provisioning over a packet-switched infrastructure.

In accordance with yet another aspect of the invention, a managed circuit emulation entity selection and configuration tool is provided. The managed circuit emulation entity selection and configuration tool provides bulk provisioning of media gateway resources in support of provisioning circuit-switched services over a packet-switched infrastructure.

The advantages are derived from provisioning in bulk media gateway resources to be controlled by a media gateway controller with improved efficiency and reducing exposure to error. The automation provided to perform bulk provisioning reduces an entry barrier in migrating circuit-switched service content transport over packet-switched infrastructure.

BRIEF DESCRIPTION OF THE DRAWINGS

The features and advantages of the invention will become more apparent from the following detailed description of the preferred embodiments with reference to the attached diagrams wherein.

Figure 1:
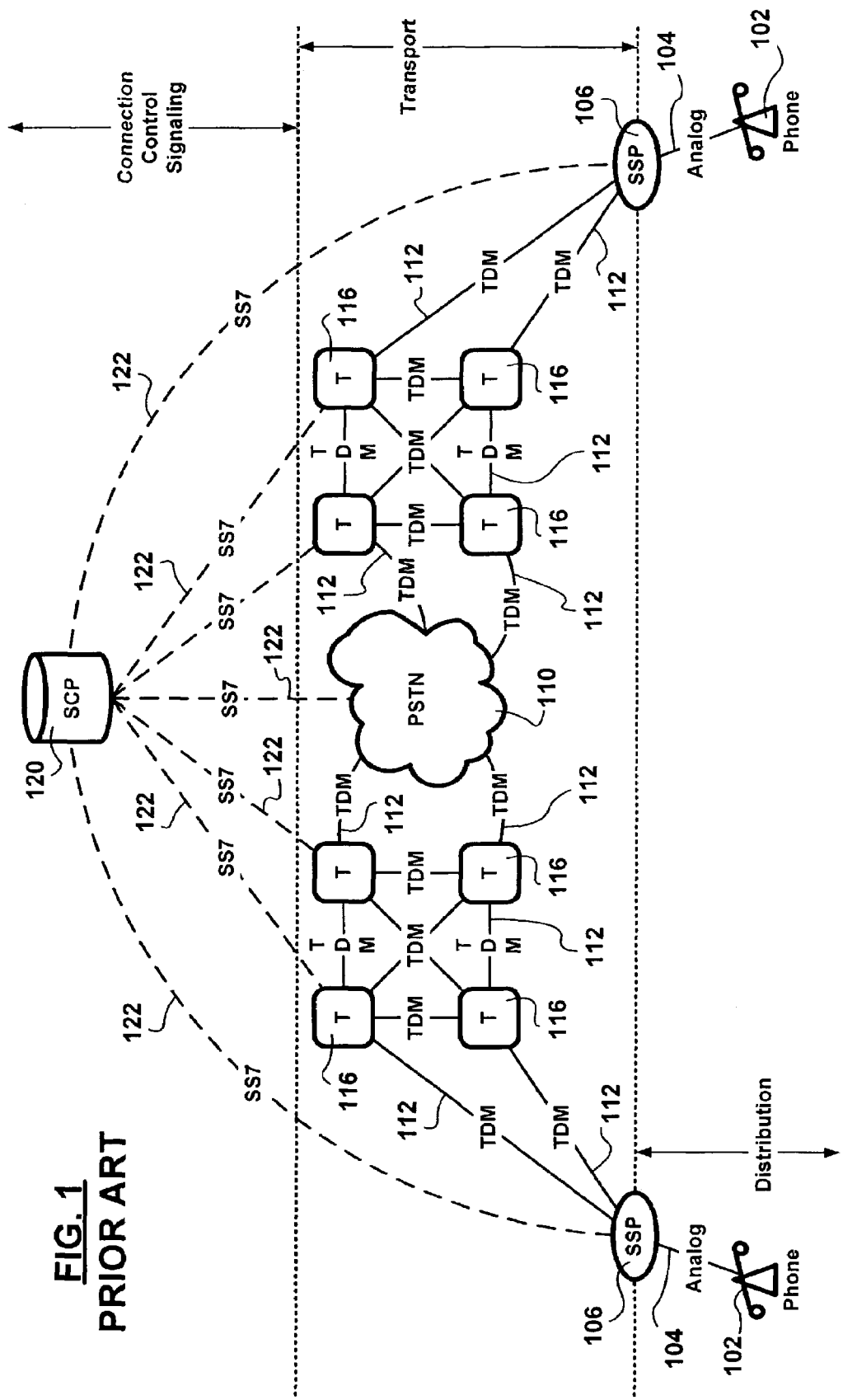
FIG. 1 is a schematic diagram showing prior art redundant circuit-switched infrastructure provisioning voice services.

It will be noted that in the attached diagrams like features bear similar labels.

DETAILED DESCRIPTION OF THE EMBODIMENTS

In accordance with an exemplary embodiment of the invention, a media gateway circuit emulation equipment configuration tool, and a method of hierarchically configuring selected managed entities in a network management context to use the H.248 protocol, and therefore to process connection control instructions issued by a Media Gateway Controller (MGC) are provided. In configuring the selected managed entities, the Network Management System (NMS) 230 causes connection control for circuit emulation resource entities to be relinquished to the MGC 220. The selected circuit emulation resources can also be re-configured to receive connection control messages from the connection manager 240. Care is exercised to ensure that only circuit emulation entities which are not in use are configured/re-configured so as not to drop services being provisioned.

The selection of circuit emulation entities is aided by specifying a high level managed entity below which configuration is performed. The specification of such a configuration context may be performed at any level of the containment hierarchy 400 by specifying: network partitions 308, network nodes 216, circuit emulation interface cards 324, and circuit emulation ports 312.

Figure 2:
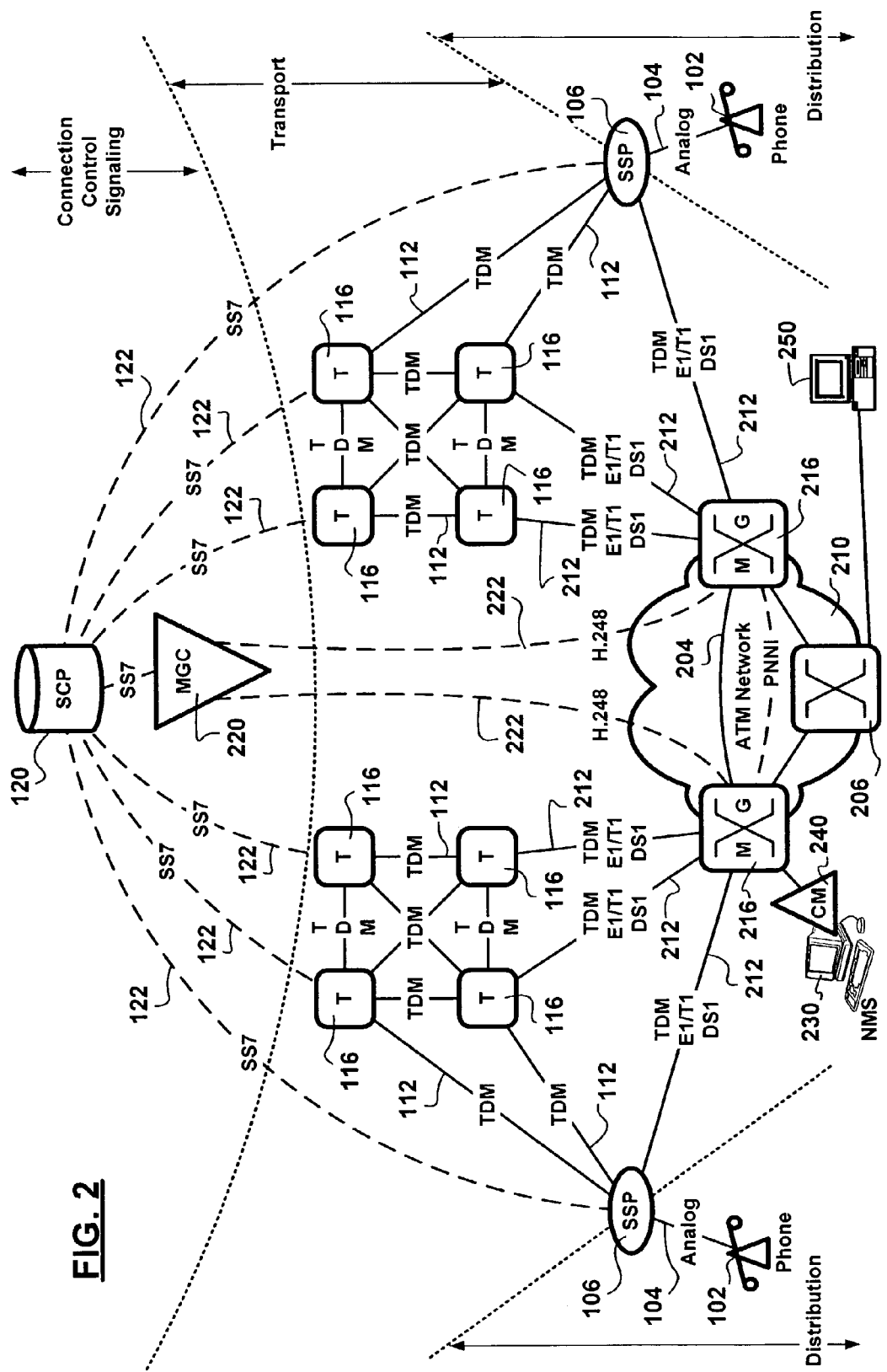
FIG. 2 is a schematic diagram showing the provisioning of voice services with transport over a exemplary packet-switched infrastructure.
Figure 4:
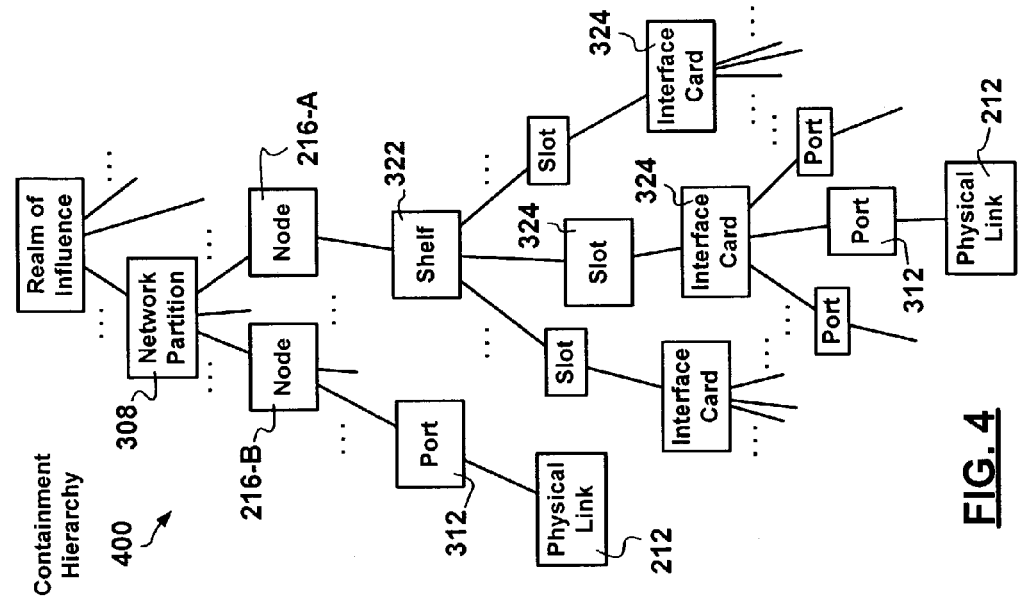
FIG. 4 is a schematic diagram showing an exemplary corresponding containment hierarchy.
Figure 3:
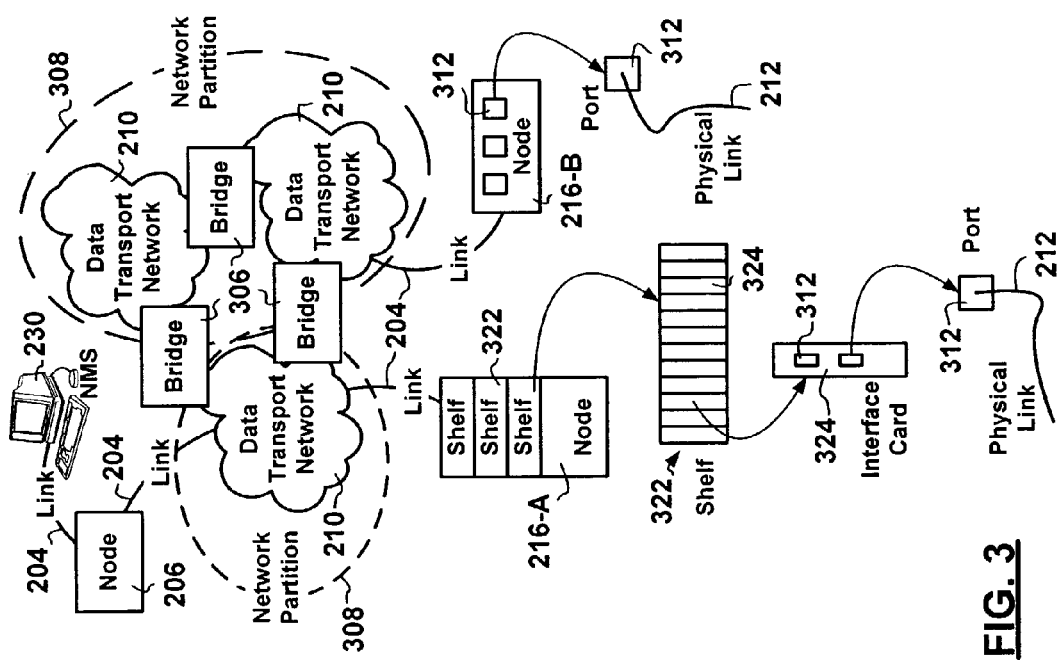
FIG. 3 is a schematic diagram showing exemplary component interconnection.
Figure 5:
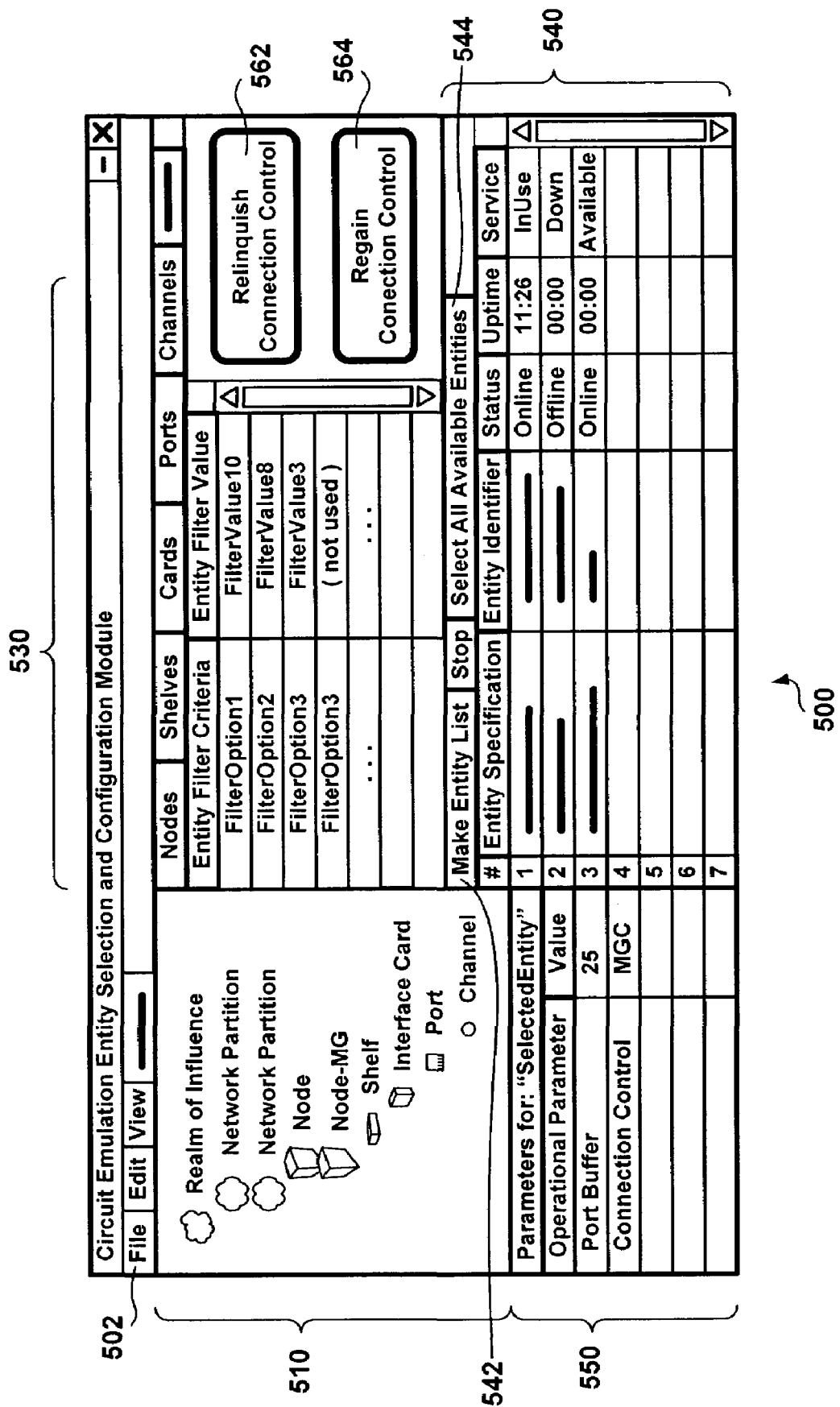
FIG. 5 is a schematic diagram of an exemplary interface adapted to select and configure circuit emulation equipment in accordance with an exemplary embodiment of the invention.

Referring back to FIG. 2, in setting up a connection, the Signal Control Point 120 employs SS7 signaling messages, exchanged over signaling links 122 with the Class 4/5 exchanges 106/116 and with the MGC 220, to request connection establishment over the hybrid infrastructure. The MGC 220 uses the H.248 protocol to communicate with and instruct the Media Gateway (MG) network nodes 216, via signaling links 222, to request the setup of a corresponding (Soft) Permanent Virtual Circuit ((S)PVC) connection in the ATM network 210 and to establish a cross-connect at the MG network nodes 216 to connect to the Class 4/5 exchanges 106/116 via circuit emulation equipment to enable the conveyance of circuit-switched service content over the packet-switched infrastructure. The connection manager 240 coordinates connection control over the intermediary network nodes 206 in the ATM network 210 for PVC connections.

In accordance with the exemplary embodiment of the invention, functionality provided by a group of view panel components is combined to define an exemplary user interface module associated with a circuit emulation entity selection and configuration tool for use in a network management context. The exemplary user interface module view panel 500 is presented to a user interacting with the circuit emulation entity selection and configuration tool. The user interface module 500 combines functionality of a tree 510, filter 530, list 540 view panel components, and possibly that of a parameter inspection view panel component 550.

A "File" menu option 502 enables retrieval of a list of circuit emulation entities for configuration. Once retrieved, the list of circuit emulation entities is presented in the list view panel 540 as will be described herein below.

In identifying a group of circuit emulation equipment, the containment hierarchy 400, under NMS 230 management, displayed in the tree view panel 510, may be navigated by interacting with the tree view panel 510. The selection of an entity of the displayed the containment hierarchy 400 creates a configuration context including all dependent containment hierarchy entities. Exemplary configuration contexts include, but are not limited to: network partition, network node, shelf, interface card, port, channel, etc.

The inclusion of dependent containment hierarchy entities in the configuration context may further be refined via interaction with the filter view panel 530. Various combinations of filter criteria and perhaps filter values may be employed in: network node, shelf, interface card, port, channel, etc. selection contexts, to discriminate between the managed entities in the containment hierarchy 400. Exemplary filter criteria used include, but are not limited to: "Media Gateway network nodes", "circuit emulation interface cards", "circuit emulation ports", "H.248 configurable channels", etc. to identify managed circuit emulation entities.

Validation of identified circuit emulation entities is provided via the list view panel 540. A list of circuit emulation targets may be displayed/refreshed by interacting with a "make list" button 542. The containment hierarchy 400, besides storing dependence relationships between managed entities, also stores managed entity specifiers holding identifiers and operational parameter values. In accordance with an exemplary implementation, all dependent branches of the containment hierarchy 400 in the configuration context are traversed to extract a list of managed entity target references identifying themselves as circuit emulation entities. The extracted list of circuit emulation entity targets is displayed in the list view panel 540. The list of managed entity targets may include circuit emulation entities such as: network nodes 216, shelves 322, circuit emulation interface cards 324, circuit emulation ports 312, and H.248 configurable channels depending on the active selection context.

Actual managed entity configuration parameters may be inspected, via the parameter view panel 550, by selecting individual managed entities via the tree view panel 510 and/or the list view panel 540.

If a list of circuit emulation equipment is retrieved (502) from a file, the list is displayed in the list view panel 540. A list of circuit emulation equipment displayed in the list view panel 540 may also be stored in a file via the "File" menu option 502.

By traversing the containment hierarchy 400 in a network management context; the intricacies of multi-vendor equipment are hidden to the user. This enables novice personnel to operate the solution therefore reducing downtime.

The list results are provided, for example, as abbreviated managed entity records, perhaps including display fields for, but not limited to, managed entity: "specification", "identification", "provisioning status", "service provisioning", etc. Exemplary provisioning states include, but are not limited to: active "On Line" and inactive "Off Line" which represent a summary of overriding dependent network node, shelf, interface card, port, cannel, etc statuses. The active "On Line" entities listed may further be categorized in accordance with service provisioning states including, but not limited to: "In Use" and "Available".

In order to effect configuration changes for circuit emulation entities, a "Select All Available Entities" button 544 may be interacted with to complete the circuit emulation managed entity selection process.

Having selected all available entities via the NMS 230 in the network management context, connection control for the selected entities may be relinquished by interacting with a button 562, or regained by interacting with a button 564. Functionality provided by the relinquish connection control button 562 and the regain connection control button 564 may be implemented by invoking NMS 230 functionality to cause the setting or resetting of connection control operational parameter values.

Each circuit emulation entity typically includes a connection control operational parameter, or equivalent, to specify the connection control entity supplying connection control instructions. In accordance with the exemplary implementation, the connection control parameter may either be set to "MGC controlled" signaling or to "CM controlled".

The functionality provided via the relinquish connection control button 562 may further include the setting of other operational parameters including, but not limited to: setting circuit emulation port buffers sizes to enable TDM traffic transport. The circuit emulation entity selection and configuration tool (500) makes use of NMS 230 functionality in configuring the selected target available managed circuit-emulation entities.

The above description provides for bulk configuration of media gateways to provide TDM signal transport over a packet-switched infrastructure. Ease of relevant circuit emulation entity selection is provided via a hierarchical determination of the relevant circuit emulation entities from a high level specification.

The exemplary use of ATM technologies to provide TDM signal transport may further be tailored to prevent blocking of the TDM traffic conveyed to ensure a high QoS. Typically the media gateway network nodes 216 will also be used to provide other ATM data transport. This makes the network nodes 216 subject to a dual control as both the connection manager 240 (for data connections) and the MGC 220 (for circuit-switched services provisioned) may instruct a network node 216 to setup connections across the ATM network 210. The ATM technology makes use of Virtual Path Identifiers and Virtual Channel Identifiers (VPI/VCI) to define connection identifiers to distinguish between connections at network nodes 206/216. There is a limit on the number of connections that can be processed by a network node 206/216, and a maximum connection counter is typically defined for each network node 206/216. The maximum connection counter value is typically set based on port density, port canalization granularity, cell switching capacity of the network node, average expected data flow bandwidth, etc. In providing transport of TDM signals, a connection is established over the ATM network potentially for every active "in use" DS-0 channel on a circuit emulation port 312. Using a VPI/VCI connection identifier for low bandwidth flows such as DS-0/DS-1 service channels may lead to early VPI/VCI connection identifier exhaustion.

Nevertheless, in a hybrid provisioning environment wherein TDM signal transport and native ATM data transport are provided in parallel, a range of VPI/VCI connection identifiers must be reserved for TDM signal transport to ensure a high QoS as the native ATM data transport may exhaust VPI/VCI connection identifiers before exhausting bandwidth.

In accordance with an exemplary implementation, a VPI/VCI connection identifier reservation operational parameter value corresponding to a MG network node 216 must therefore be increased as control over associated circuit emulation DS-1/DS-0 channels is relinquished by the NMS 230. In regaining control of circuit emulation DS-1/DS-0 channels, the VPI/VCI connection identifier reservation counter must therefore be decreased. Alternatively, in accordance with another exemplary implementation, the maximum connection count is decreased in relinquishing control over DS-1/DS-0 circuit emulation channels, and the maximum connection count may be increased in regaining control over DS-1/DS-0 circuit emulation channels. The increase and decrease of the counters need not necessarily correspond on a one-to-one basis with DS-1/DS-0 channel configurations, but rather may be adjusted up or down based on an expected fraction of aggregate bandwidth expected to carry TDM traffic.

The embodiments presented are exemplary only and persons skilled in the art would appreciate that variations to the above described embodiments may be made without departing from the spirit of the invention. The scope of the invention is solely defined by the appended claims.

We claim:

1. A method of provisioning media gateway resources in a network management context, the method comprising:
   identifying a plurality of managed circuit emulation entities;
   selecting a group of available managed circuit emulation entities; and
   setting connection control operational parameters corresponding to a subgroup of available managed circuit emulation entities to configure connection control for each available managed circuit emulation entity,
wherein identifying the plurality of managed circuit emulation entities comprises selecting a managed entity from a containment hierarchy specifying hierarchical managed entity associations in support of the network management context, the selection of the managed entity from the containment hierarchy defining a configuration context, wherein setting connection control operational parameters to configure connection control for a managed circuit emulation entity comprises relinquishing connection control for the managed circuit emulation entity over to a media gateway controller,
and whereby the bulk identification of the plurality of managed circuit emulation entities in the network management context reduces media gateway resource provisioning overheads in provisioning transport for circuit-switched services over a packet-switched infrastructure.

2. The method of provisioning media gateway resources as claimed in claim 1, wherein relinquishing connection control for the managed circuit emulation entity further comprises setting circuit emulation entity operational parameters to enable support for circuit-switched service provisioning over a packet-switched infrastructure.

3. The method of provisioning media gateway resources as claimed in claim 2, wherein setting circuit emulation entity operational parameters comprises setting port buffer parameters.

4. The method of provisioning media gateway resources as claimed in claim 2, wherein setting circuit emulation entity operational parameters comprises reserving connection identifiers for circuit-switched service use.

5. A managed circuit emulation entity selection and configuration tool comprising:
   a. interactive selection elements employed in a selected network management configuration context to identify a plurality of available managed circuit emulation entities by traversing all branches of a containment hierarchy storing managed entity information;
   b. a first interactive button, which when activated causes connection control for each active managed circuit emulation entity in the plurality of available managed circuit emulation entitles to be relinquished to a media gateway controller; and
   c. a second interactive button, which when activated causes connection control for each active managed circuit emulation entity in the plurality of available managed circuit emulation entities to be regained;
the bulk identification of the plurality of available managed circuit emulation entities in the network management configuration context reducing media gateway resource provisioning overheads in provisioning transport for circuit-switched services over a packet-switched infrastructure.

* * * * *